April 16, 1935.  W. F. HEROLD  1,998,236
BRAKE FOR CASTERS
Filed Jan. 26, 1932
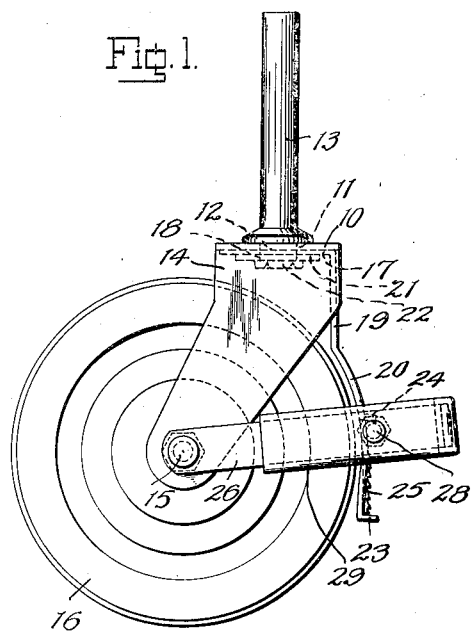
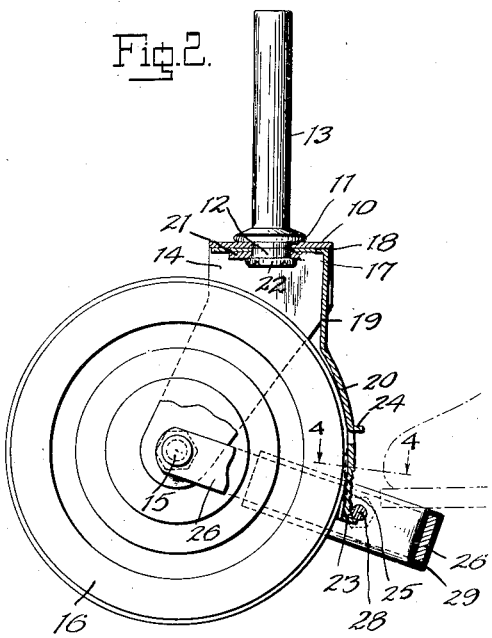
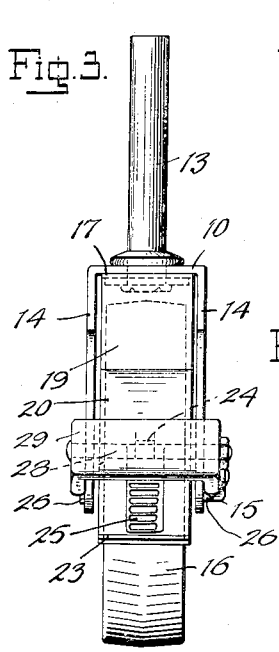
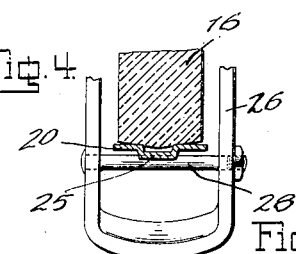
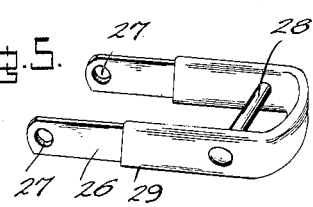
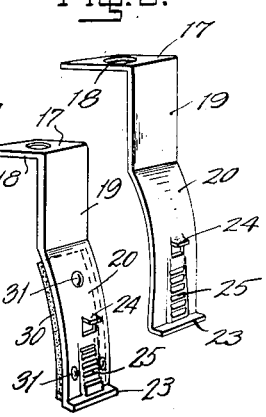
INVENTOR.
WALTER F. HEROLD.
BY
ATTORNEY Patented Apr. 16, 1935

1,998,236

UNITED STATES PATENT OFFICE 1,998,236

BRAKE FOR CASTERS

Walter F. Herold, Bridgeport, Conn., assignor to The Bassick Company, Bridgeport, Conn., a corporation of Connecticut Application January 26, 1932, Serial No. 588,869

5 Claims. (Cl. 188—74)

The present invention relates to improvements in casters, particularly for hospital beds, operating tables, portable machines, and the like, that are adapted normally to remain in a stationary position, and the invention consists in braking means constituting a part of the caster, which will permit free movement of the caster wheel when it is desired to move the bed or other furniture about, and which will effectually retard or lock the wheel against movement at other times, an object being to provide such a device of simple and reliable construction, which may be operated with facility and will be efficient and reliable.

In certain casters heretofore in use the locking of the caster necessitated a change in the level of the furniture, engagement of the braking means with the floor, changes in the caster mounting and wheel supporting horn, and other features which were either expensive, complicated, unreliable, or otherwise disadvantageous, and to the end of obviating these conditions I propose to provide, in the illustrated exemplary embodiment of my invention, a braking means of simple construction which may be attached to a caster of usual construction without the necessity of altering its construction or manufacturing processes, which may be operated to produce full braking effect with very little effort, and which will not be loosened through turning pressure on the wheel as is the case with certain braking means heretofore in use.

With the above and other objects in view embodiments of the invention are shown in the accompanying drawing and these embodiments will be hereinafter more fully described with reference thereto, and the invention will be finally pointed out in the claims.

In the drawing:

Fig. 1 is a side elevation of a caster according to the illustrated exemplary embodiment of my invention and showing the braking means in inoperative position.

Fig. 2 is a side elevation, partially broken away and in vertical section, and showing the operative position.

Fig. 3 is a rear elevation, the braking mechanism being in the inoperative position illustrated in Fig. 1.

Fig. 4 is a detail fragmentary sectional view, taken along the line 4—4 of Fig. 2.

Fig. 5 is a perspective view of the brake operating lever employed.

Fig. 6 is a perspective view of the wheel engaging brake member employed.

Fig. 7 is a perspective view of a modified form of the invention.

Similar reference characters indicate corresponding parts throughout the several figures of the drawing.

Referring to the drawing, the illustrated exemplary embodiment of the invention shown therein comprises a caster horn of normal type having a flat top 10, in the central aperture 11 of which the reduced and shouldered end 12 of the pintle 13 is engaged, and side legs 14—14 carrying a transverse axle 15, offset with respect to the swiveling axis of the pintle, and upon which the wheel 16 is mounted. This wheel may be of any suitable type, depending upon the particular use for which the caster is intended. It may, depending on the particular use, have a yielding tread, as of rubber, felt or the like, or a semi-yielding tread, as of wood, fibre, bakelite, or the like or a hard tread, as of metal or other non-yielding material.

The brake member, which may be conveniently formed of a strip of spring metal, comprising an upper attaching portion 17 of rectangular form having an aperture 18 for engagement with the end 12 of the pintle, a depending portion 19 bent downwardly from the portion 17, and a braking portion 20, substantially concentric at its upper portion to the caster wheel and extending tangentially at its lower end portion below the horizontal plane of the wheel axis. As shown in Fig. 2 the brake member is secured to the under side of the horn top simply by engaging the pintle end 12 in the aperture 18 and clamping it in place by the usual pintle securing washer 21, against the under side of which the pintle end is swaged, as at 22.

The lower end of the brake member has a stop flange 23 bent outwardly therefrom and in spaced relation above this flange an upper stop lug 24 is struck outwardly from the portion 20. Between the stop flange 23 and the stop lug 24 a series of ratchet teeth 25 are embossed out from the portion 20 these being of gradually increasing projection from top to bottom. As shown in Fig. 4, the embossing of the ratchet teeth along a portion spaced inwardly from the outer vertical edges provides a recess upon the wheel engaging side of the brake member, so that when the brake is applied the crown of the tread engages this recess and the brake bears upon a substantial surface of the tread distributed at each side of the crown, so that a relatively great braking pressure may be applied and at the same time the danger of injury to the tread surface is minimized.

The brake operating lever 26 is in the form of a U-shape yoke having its ends apertured, as at 27—27, and pivotally engaged upon the ends of the wheel axle 15, being retained by the headed end at one end of the axle and the nut at the other. The yoke extends beyond the brake member for a sufficient distance to permit the transverse end portion to be engaged by the foot, as indicated in Fig. 2. A transverse bar 28 is connected to and extends between the side portions at an inwardly spaced point and is arranged to engage the outer side of the brake member between the stops 23 and 24. The yoke is preferably sheathed in a covering 29 of rubber tubing, or the like, to provide protection against marring articles which might come into contact with it, and also to provide a frictional gripping surface for engagement by the foot.

In the inoperative position of the brake this portion 20 is spaced from the wheel tread in substantially concentric relation thereto and the bar 28 abuts the upper stop lug 24, the lever being at a slight upward inclination from the horizontal plane of the wheel axis, so that the tendency of the brake member to spring outwardly and the inward curve of its surface effectually retains the lever in its inoperative position against the stop lug. To apply the brake the lever is pressed downwardly by the foot, as indicated in Fig. 2. When pressed downwardly to a sufficient extent to bind tightly against the wheel tread the braking effect is sufficient to positively lock the wheel against movement, while at the intermediate positions determined by the ratchet teeth 25 the braking effect is graduated, so that it is possible to apply the brake in a manner to retard turning of the wheel to any desired degree, without actually preventing it from turning. It will be understood that the ratchet teeth 25 are so spaced that the bar 28 can seat between each tooth, where it will be yieldably retained.

The arrangement of the brake means is such that turning pressure that may be exerted against the wheel will not tend to loosen or disturb the adjustment of the brake means.

In Fig. 7 I have shown a modification in which the brake member is provided with a facing 30, secured to it as by rivets 31, and which may be of any suitable material, as ordinary brake lining. This facing will preferably be slightly resilient, and in this case will be especially desirable for engagement with a hard tread.

I have illustrated and described a preferred and satisfactory embodiment of the invention, but it will be obvious that changes may be made therein, within the spirit and scope thereof, as defined in the appended claims.

Having thus described my invention what I claim and desire to secure by Letters Patent is:—

1. In a caster, a wheel carrying member, a wheel rotatable therein, a brake member carried by said wheel carrying member and surrounding a portion of said wheel tread, and a movable actuating member movable concentrically of the wheel and slidably engaging said brake member adapted upon movement in one direction to press said brake member into braking engagement with said wheel tread.

2. In a caster, a wheel carrying member, a wheel rotatable therein, a resilient brake member carried by said wheel carrying member surrounding a portion of said wheel tread said member normally tending to spring away from said wheel tread, a yoke lever slidably engaging said brake member adapted upon movement in one direction to press said brake member into braking engagement with said wheel tread, and upon movement in the other direction to permit said brake member to spring away from said wheel tread, said brake member having means adapted to releasably and yieldably retain said yoke lever in any of its moved positions.

3. In a caster, a wheel carrying member, a wheel rotatable therein, a resilient brake member carried by said wheel carrying member surrounding a portion of said wheel tread said member normally tending to spring away from said wheel tread, a yoke lever slidably engaging said brake member adapted upon movement in one direction to press said brake member into braking engagement with said wheel tread, and upon movement in the other direction to permit said brake member to spring away from said wheel tread, said brake member having ratchet means adapted to yieldably retain said yoke lever in its moved positions.

4. In a caster, a wheel carrying horn, a wheel rotatable therein, a resilient brake member carried by said horn and surrounding a portion of said wheel tread, an actuating yoke lever pivotally mounted coaxial with the wheel axis and slidably engaging said brake member adapted upon movement in one direction to press said brake member into braking engagement with said wheel tread, and upon movement in the other direction to permit said brake member to spring away from said wheel tread, said brake member having a yoke lever engaging portion non-concentric to said wheel.

5. In a caster, a wheel carrying member, a wheel rotatable therein, a movable brake member carried by said wheel carrying member having an arcuate tread engaging portion surrounding a portion of said wheel tread with its concave side contiguous to and adapted to engage the wheel tread, an actuating member movable concentrically of the wheel axis and slidably engaging said brake member adapted upon movement in one direction to press said brake member into braking engagement with said wheel tread, and upon movement in the other direction to permit said brake member to move away from said wheel tread, and camming means cooperating between said brake member and said actuating member whereby increased movement of said actuating member applies said brake member against the tread with increased pressure.

WALTER F. HEROLD.